Patented Dec. 23, 1941

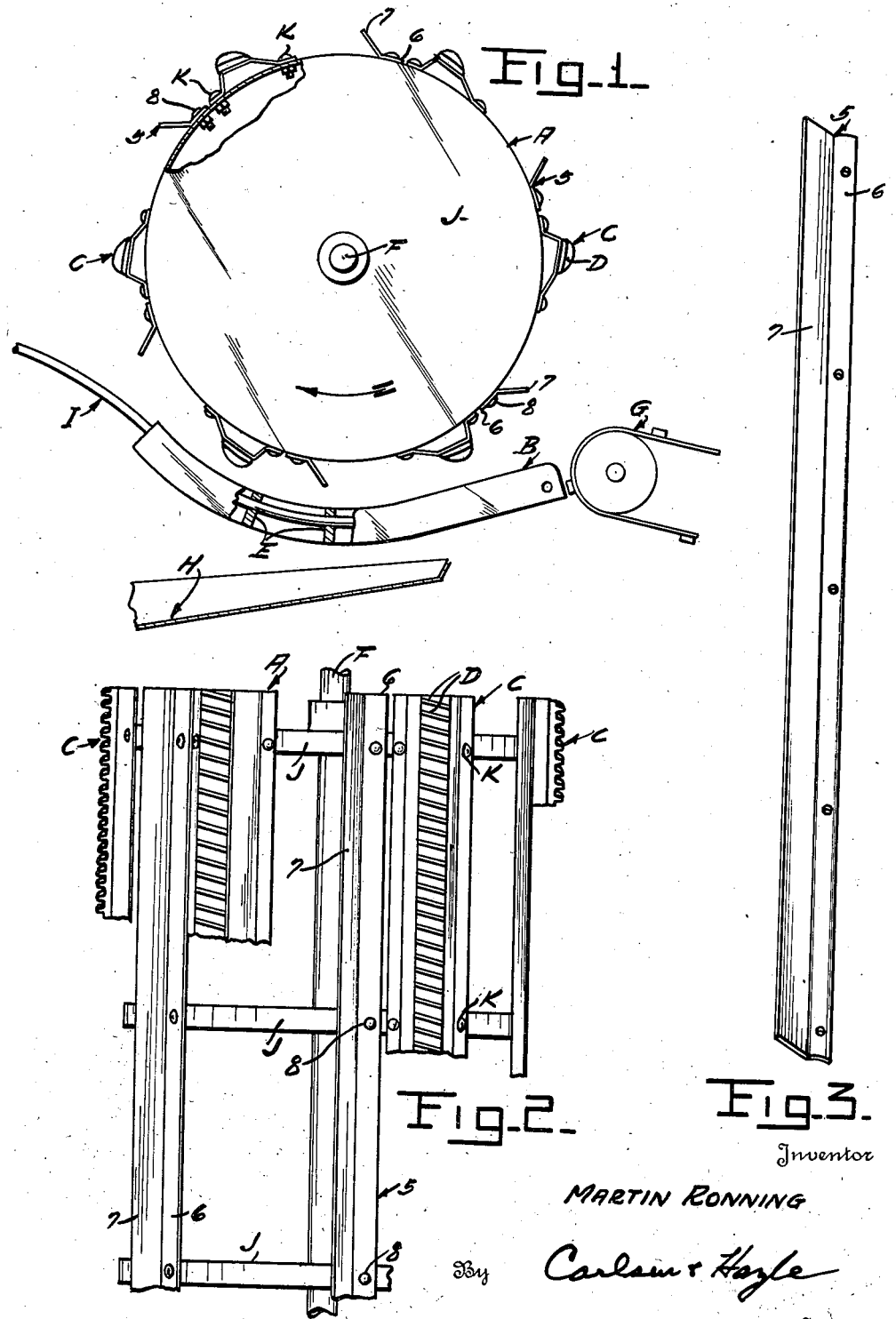

2,266,806

UNITED STATES PATENT OFFICE 2,266,806

AUXILIARY BAR FOR THRESHING CYLINDERS

Martin Ronning, St. Louis Park, Minn., assignor to Minneapolis-Moline Power Implement Company, Minneapolis, Minn., a corporation of Delaware Application August 2, 1940, Serial No. 349,683

2 Claims. (Cl. 130—27)

This invention relates generally to improvements in the threshing mechanisms of combines such as used in the harvesting and threshing of various crops.

The usual mechanism for this purpose includes a grate-like concave over which rotates a cylinder having a series of spaced rasp bars for feeding or advancing the grain and rubbing out the kernels or seeds against the concave. Under some circumstances, as for instance in the threshing of flax, crimson clover and alfalfa, or the threshing of unevenly ripened grains, there has been noted a tendency of the material to be carried through between the rasp bars without being subjected by the bars to a sufficient rubbing action over the concave. This of course is very disadvantageous to the operation of the combine.

My invention therefore particularly relates to, and has as its primary object, the provision of means for increasing the rubbing or threshing action on such crops as necessary and the prevention of such materials from being carried through between the rasp bars without adequate rubbing action thereby.

A further object is to provide means of this kind in the form of auxiliary bars or strips which may be applied to the cylinder between the main rasp bars and which by their shape and position will have the dual functions of preventing the material from working through the spaces between the rasp bars and urging the material outwardly against the concave for rubbing and threshing action by the rasp bars.

These and other more detailed and specific objects will be disclosed in the course of the following specification, reference being had to the accompanying drawing, in which—

Fig. 1 is an end view of a cylinder and concave assembly embodying both the usual cylinder rasp bars and my improved auxiliary bars or strips.

Fig. 2 is a fragmentary plan view of the cylinder equipped with the bars as shown in Fig. 1.

Fig. 3 is an enlarged perspective view of one of the auxiliary bars alone.

Referring now more particularly and by reference characters to the drawing, A represents the cylinder and B the concave constituting a threshing mechanism of well known and proven form. The cylinder A has a series of rasp bars C arranged lengthwise or parallel to its axis of rotation and at evenly spaced points around its periphery, the said bars having the usual rasp teeth D which act to feed the harvested grain along the arcuate surface of the concave B and to rub the grain against the cross bars E of the concave. For this purpose the cylinder is rotated in the direction indicated by the arrow by the shaft or axle F and by connection therewith of any suitable driving means (not shown).

The grain after being cut is fed to the threshing mechanism by such means as a conveyor G and the grain rubbed from the straw falls through the interstices in the concave to a delivery member or pan H while the straw moves off the fingers I at the rear of the concave.

As thus far described the structure is largely conventional and it serves its intended purposes admirably under most circumstances. However, in the threshing of some crop materials, such as the flax, clover and alfalfa hereinbefore referred to, it has been found that several deleterious actions occur.

The usual structure of the cylinder A comprises a series of disks or heads J secured in spaced relation upon the axle F and having outer margins flanged to provide mounting surfaces for the bolts K fastening the rasp bars C in place. There are thus present numerous spaces or openings between the heads J, and between the rasp bars, and it is found that certain materials have a tendency to fall or be carried through these spaces and therefore are not subjected to proper rubbing action.

Also in the threshing of some crops, particularly where uneven ripening has taken place, there is required a greater than usual rubbing action in order to separate the seed or grain from the heads.

There is a need, therefore, for a means to prevent the crop materials from working between the rasp bars of the cylinder and to increase the rubbing action when required, and this need my invention aims to fill. For this purpose I provide auxiliary bars or strips designated generally at 5 which are formed from sheet or strip material having relatively narrow mounting edges 6 and wider working portions, flanges, or webs 7 which are bent angularly at their junction with said mounting edges. The bars are mounted by bolts 8 across the head disks J of the cylinder by the provision of suitable openings both in the mounting edges 6 and in the flanged margins of said disks, and the bars are preferably arranged adjacent to and parallel with the rasp bars C as shown.

When thus mounted the auxiliary bars to a considerable extent close off the spaces between the rasp bars C, thus largely by this means preventing the materials from working or being carried through the cylinder A between the bars, Of equal, if not greater, importance, however, is the action of the auxiliary bars in driving or forcing the material outwardly against the concave B. The angular formation and position of the working portions 7 of the bars is such that they slope or incline backwards relative to their orbital path of travel in the rotation of the cylinder and the result therefore of their action against the grain, being carried between the cylinder and concave, is to drive the grain outward and downward against the concave. The frictional contact between the material and concave is then sufficient to retard its advance until following rasp bars C engage and rub out the kernels against the concave bars as will be understood. To enhance such action the auxiliary bars C are mounted rearwardly of the trailing edges of the rasp bars as is clearly shown.

The auxiliary bars thus greatly increase the rubbing action without themselves having such rubbing or rasping action on the grain. Instead they simply drive the material outward and move it into position for best action by the regular rasp bars of the cylinder. The outer edges of the auxiliary bars may in fact inscribe a circle of a diameter less than that of the outermost edges of the rasp bars as herein shown.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a rotatable threshing cylinder having plurality of lengthwise extending rasp bars mounted rigidly in spaced positions along its peripheral surface, a series of auxiliary strips rearwardly mounted by longitudinal edge portions on the surface of the cylinder in spaced relation to the said rasp bars, and the said strips having longitudinal flange portions turned extending from their mounted edges and turned angularly and outwardly away from the cylinder in trailing positions with respect to the direction of rotation of the cylinder.

2. In a rotatable threshing cylinder having a plurality of rasp bars extending longitudinally and disposed in circumferentially spaced positions for threshing operation upon grain passing around a portion of the cylinder, an auxiliary bar comprising an elongated strip detachably secured by one edge portion adjacent each of the respective rasp bars and having a flange portion extending away from said rasp bar in outwardly and angularly trailing position with respect to the cylinder and its direction of rotation, the free edge of the auxiliary bar being disposed slightly within the circular path of the rasp bar to thereby operate upon the grain in conjunction with said rasp bar.

MARTIN RONNING.